(12) United States Patent
Bacharach et al.

(10) Patent No.: US 12,293,400 B2
(45) Date of Patent: May 6, 2025

(54) METHODS, SYSTEMS, AND MEDIA FOR PROVIDING INFORMATION BASED ON GROUPING INFORMATION

(71) Applicant: FINDMINE, New York, NY (US)

(72) Inventors: Michelle Harrison Bacharach, New York, NY (US); Konstantin Olegovich Itskov, New York, NY (US)

(73) Assignee: FINDMINE, New York, NY (US)

( * ) Notice: Subject to any disclaimer, the term of this patent is extended or adjusted under 35 U.S.C. 154(b) by 0 days.

(21) Appl. No.: 17/971,008

(22) Filed: Oct. 21, 2022

(65) Prior Publication Data

US 2023/0316377 A1   Oct. 5, 2023

Related U.S. Application Data

(63) Continuation of application No. 16/716,022, filed on Dec. 16, 2019, now abandoned, which is a
(Continued)

(51) Int. Cl.
*G06Q 30/00* (2023.01)
*G06Q 30/0601* (2023.01)

(52) U.S. Cl.
CPC ................. *G06Q 30/0631* (2013.01)

(58) Field of Classification Search
CPC . G06Q 30/00; G06Q 30/0601; G06Q 30/0631
See application file for complete search history.

(56) References Cited

U.S. PATENT DOCUMENTS 6,999,941 B1 * 2/2006 Agarwal ............ G06Q 30/0625
705/26.81
7,089,216 B2   8/2006 Van Overveld
(Continued)

FOREIGN PATENT DOCUMENTS

| CN | 101828167 A | 9/2010 |
| CN | 105354581 A | 2/2016 |
| WO | 2015107424 A1 | 7/2015 |

OTHER PUBLICATIONS

Niu, Wei, James Caverlee, and Haokai Lu. "Neural personalized ranking for image recommendation." Proceedings of the eleventh ACM international conference on web search and data mining. 2018. (Year: 2018).*

(Continued)

*Primary Examiner* — Christopher B Seibert
(74) *Attorney, Agent, or Firm* — Mintz, Levin, Cohn, Ferris, Glovsky and Popeo, P.C.

(57) ABSTRACT

Methods, systems, and media for recommending information based on grouping information are provided. In some embodiments, the method comprises: identifying a first item of interest to a user of a user device; receiving data corresponding to the first item; classifying, using a hardware processor, the data to obtain one or more attributes of the first item; identifying a second item similar to the first item based on similarity of the one or more attributes of the first item to one or more attributes of the second item; identifying a plurality of bundles of items that each includes the second item; ranking the plurality of bundles of items; and selecting a bundle of items from the plurality of bundles of items for recommendation to the user of the user device.

17 Claims, 5 Drawing Sheets

Related U.S. Application Data continuation of application No. 15/451,165, filed on Mar. 6, 2017, now abandoned.

(60) Provisional application No. 62/303,598, filed on Mar. 4, 2016.

(56) References Cited

U.S. PATENT DOCUMENTS

| | | | |
|---|---|---|---|
| 8,055,639 B2 | 11/2011 | Rotholtz | |
| 8,260,684 B2 | 9/2012 | Flusser et al. | |
| 8,260,864 B2 | 9/2012 | Sana et al. | |
| 8,290,818 B1* | 10/2012 | Levitan | G06Q 30/0631 705/26.7 |
| 8,429,026 B1* | 4/2013 | Kolawa | G06Q 30/00 705/26.7 |
| 2006/0020614 A1* | 1/2006 | Kolawa | G06Q 30/02 |
| 2008/0243637 A1* | 10/2008 | Chan | G06Q 30/02 705/26.1 |
| 2008/0243817 A1* | 10/2008 | Chan | G06Q 30/02 707/999.005 |
| 2009/0019053 A1* | 1/2009 | Burgess | G06Q 30/02 |
| 2009/0234712 A1* | 9/2009 | Kolawa | G06Q 30/0631 705/26.7 |
| 2009/0234876 A1 | 9/2009 | Schigel et al. | |
| 2009/0259561 A1* | 10/2009 | Boys | G06Q 30/0601 705/26.1 |
| 2011/0029526 A1 | 2/2011 | Knight et al. | |
| 2011/0184831 A1* | 7/2011 | Dalgleish | G06Q 30/0631 705/26.7 |
| 2011/0184832 A1 | 7/2011 | Wannier et al. | |
| 2011/0191311 A1* | 8/2011 | Polonsky | G06F 16/335 707/706 |
| 2011/0191374 A1* | 8/2011 | Bengio | G06F 16/53 707/E17.014 |
| 2012/0245887 A1 | 9/2012 | Spears et al. | |
| 2012/0296701 A1* | 11/2012 | Breiter | G06Q 30/0203 705/7.33 |
| 2012/0323899 A1 | 12/2012 | Ilyas et al. | |
| 2013/0083999 A1 | 4/2013 | Bhardwaj et al. | |
| 2013/0159325 A1* | 6/2013 | Polonsky | G06F 16/245 707/754 |
| 2013/0317642 A1 | 11/2013 | Asaria et al. | |
| 2014/0067597 A1 | 3/2014 | Kirkby et al. | |
| 2014/0344102 A1* | 11/2014 | Cooper | G06Q 30/0631 705/26.7 |
| 2015/0073589 A1 | 3/2015 | Khodl et al. | |
| 2015/0170250 A1* | 6/2015 | Dalal | G06Q 30/0623 705/26.7 |
| 2015/0206222 A1* | 7/2015 | Bart | G06Q 30/0631 705/26.7 |
| 2015/0360865 A1* | 12/2015 | Massey | B25J 11/008 414/275 |
| 2016/0093334 A1* | 3/2016 | Kim | G06V 20/30 386/278 |
| 2016/0180402 A1* | 6/2016 | Sabah | G06F 16/24578 705/14.66 |
| 2017/0039607 A1* | 2/2017 | Stiernagle | G06Q 10/087 |
| 2017/0066592 A1* | 3/2017 | Bastian, II | B25J 5/02 |
| 2017/0228382 A1* | 8/2017 | Haviv | G06Q 30/0631 |
| 2017/0336920 A1* | 11/2017 | Chan | G07C 5/0825 |
| 2018/0268458 A1* | 9/2018 | Popa | G06V 40/169 |
| 2019/0188314 A1* | 6/2019 | Mirizzi | G06F 16/285 |
| 2020/0007934 A1* | 1/2020 | Ortiz | H04N 21/25883 |
| 2020/0272915 A1* | 8/2020 | Tata | G06F 16/35 |
| 2021/0125154 A1* | 4/2021 | Lewis | G06Q 10/20 |
| 2023/0316377 A1* | 10/2023 | Bacharach | G06Q 30/0631 705/26.7 |
| 2023/0344868 A1* | 10/2023 | Kaligotla | H04L 63/1416 |
| 2024/0256592 A1* | 8/2024 | O'Neill | G06F 16/483 |
| 2024/0412542 A1* | 12/2024 | O'Neill | G06V 20/49 |

OTHER PUBLICATIONS

Liu, Huwei, et al. "Deep-learning-based accurate identification of warehouse goods for robot picking operations." Sustainability 14.13 (2022): 7781. (Year: 2022).*

* cited by examiner

METHODS, SYSTEMS, AND MEDIA FOR PROVIDING INFORMATION BASED ON GROUPING INFORMATION

CROSS REFERENCE TO RELATED APPLICATION

This application is a continuation of U.S. patent application Ser. No. 16/716,022, filed on Dec. 16, 2019, which is a continuation of U.S. patent application Ser. No. 15/451,165, filed on Mar. 6, 2017, which claims the benefit of U.S. Provisional Patent Application No. 62/303,598, filed Mar. 4, 2016, each of which is hereby incorporated by reference herein in its entirety.

TECHNICAL FIELD

The disclosed subject matter relates to methods, systems, and media for providing information based on grouping information.

BACKGROUND

Users often search online for a particular item (e.g., food items, articles, etc.). In some cases, users may enjoy receiving recommendations for items that would complement the item they are searching for. For example, a user looking for information about a particular food (e.g., a sandwich, a soup, a salad, etc.) may benefit from receiving information that indicates other foods or drinks that may complement the food item, such as an appetizer that would complement the food, a beverage that would pair well with the food, etc. As another example, a user looking for news about a particular topic may want to receive information indicating other news articles that may be of interest to the user. As yet another example, a user searching for a particular craft item (e.g., a particular type of yarn, a particular type of knitting needle, etc.) may benefit from information indicating other craft items (e.g., a type of scissors, etc.) that may be useful in completing a craft project. However, it can be difficult to identify items or identify information that may be useful to the user.

Accordingly, it is desirable to provide new methods, systems, and media for providing information based on grouping information.

SUMMARY

Methods, systems, and media for recommending information based on grouping information are provided. In accordance with some embodiments of the disclosed subject matter, methods for recommending information based on grouping information are provided, the methods comprising: identifying a first item of interest to a user of a user device; receiving data corresponding to the first item; classifying, using a hardware processor, the data to obtain one or more attributes of the first item; identifying a second item similar to the first item based on similarity of the one or more attributes of the first item to one or more attributes of the second item; identifying a plurality of bundles of items that each includes the second item; ranking the plurality of bundles of items; and selecting a bundle of items from the plurality of bundles of items for recommendation to the user of the user device.

In accordance with some embodiments of the disclosed subject matter, systems for recommending information based on grouping information are provided, the systems comprising: a hardware processor that is programmed to: identify a first item of interest to a user of a user device; receive data corresponding to the first item; classify the data to obtain one or more attributes of the first item; identify a second item similar to the first item based on similarity of the one or more attributes of the first item to one or more attributes of the second item; identify a plurality of bundles of items that each includes the second item; rank the plurality of bundles of items; and select a bundle of items from the plurality of bundles of items for recommendation to the user of the user device.

In accordance with some embodiments of the disclosed subject matter, non-transitory computer-readable media containing computer executable instructions that, when executed by a processor, cause the processor to perform a method for recommending information based on grouping information is provided. The method comprising: identifying a first item of interest to a user of a user device; receiving data corresponding to the first item; classifying the data to obtain one or more attributes of the first item; identifying a second item similar to the first item based on similarity of the one or more attributes of the first item to one or more attributes of the second item; identifying a plurality of bundles of items that each includes the second item; ranking the plurality of bundles of items; and selecting a bundle of items from the plurality of bundles of items for recommendation to the user of the user device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for recommending information based on grouping information are provided.

In some embodiments, the mechanisms described herein can receive an indication of a first item and can identify items to be recommended to a user based on the first item. In some embodiments, the mechanisms can identify a second item similar to the first item (based on any suitable attributes of the items) and can identify bundles of items that each include the identified second item. The mechanisms can then identify a third item included in one of the identified bundles of items and can recommend the third item to the user. In some embodiments, the third item can therefore be an item that would complement the first item.

For example, in instances where the first item is an article (e.g., a news article, and/or any other suitable type of article), the mechanisms can identify a second article that is similar to the first article (e.g., written by the same author, published in the same edition of a newspaper or magazine, pertaining to the same topic, and/or similar in any other aspect) and can identify a group of articles that include the first article (e.g., included in a group of links to articles in a blog post, included in the same edition of a newspaper or magazine, and/or any other suitable group of articles). The mechanisms can then recommend a third article included in the group of articles as one that might be of interest to the viewer. As another example, in instances where the first item is a food item (e.g., pasta, rice, chicken, tofu, and/or any other suitable food item), the mechanisms can identify a second food item that is similar to the first food item (e.g., based on nutritional information, based on a food group associated with the first food item, and/or based on any other suitable attributes), and can identify one or more meals that include the second food item. The mechanisms can then recommend a third food item or a drink included in the one or more meals as a suitable complement to the first food item. As yet another example, in instances where the first item is a craft item (e.g., a type of yarn, a type of sewing needle, a type of thread, a type of paint, and/or any other suitable type of craft item), the mechanisms can identify a second craft item that is similar to the first item (e.g., used in a similar type of craft, and/or similar in any other suitable manner) and can identify one or more craft projects (e.g., a painting, a knit project, and/or any other suitable type of craft project) that uses the second craft item. The mechanisms can then recommend a third craft item included in the identified craft project as likely to be of interest to the user. As still another example, in instances where the first item is an item of clothing (e.g., a shirt, a pair of pants, and/or any other suitable item of clothing), the mechanisms can identify a second item of clothing that is similar to the first item of clothing (e.g., based on color, formality, length, and/or any other suitable attribute), and can identify one or more outfits that include the second item of clothing. The mechanisms can then recommend one or more items of clothing included in the identified outfits as suitable for pairing with the first item and/or recommend the identified outfits. As a more specific example, in instances where the first item of clothing is a shirt, the mechanisms can identify one or more outfits that include a similar shirt (e.g., similar in color, similar in style, similar in formality, and/or similar in any other suitable aspect) and can recommend pants that have been included in outfits that include the similar shirt as suitable pants for wearing with the first shirt.

Note that, in some embodiments, any suitable number (e.g., one, two, five, ten, and/or any other suitable number of items) can be recommended. For example, in instances where the bundle of items corresponds to a meal composed of multiple dishes, the mechanisms can cause any suitable number of the dishes of the meal to be recommended. As another example, in instances where the bundle of items corresponds to an outfit composed of multiple clothing items, the mechanisms can cause any suitable number of clothing items to be recommended. Note that, in some embodiments, the mechanisms can cause an entire bundle of items to be recommended. In some such embodiments, the recommendation can exclude the item of the bundle of items that was matched as similar to the first item.

In some embodiments, the bundles of items that include the second item similar to the first item can be ranked in any suitable manner. For example, in some embodiments, the bundles of items can be ranked based on whether a bundle of items satisfies particular criteria. As a more particular example, in instances where a bundle of items corresponds to a group of articles, bundles of items can be ranked based on a quality of a source of the articles (e.g., a circulation number of a publisher, and/or any other suitable quality metric), an aggregate or average viewership number of articles in the group of articles, and/or any other suitable criteria. As another more particular example, in instances where a bundle of items corresponds to a meal, bundles of items can be ranked based on whether they satisfy criteria related to nutrition information of the meal, dietary guidelines (e.g., vegetarian, vegan, non-dairy, and/or any other suitable guidelines), and/or any other suitable criteria. In some such embodiments, the mechanisms can identify bundles to be recommended and/or items included in particular bundles of items to be recommended based on the ranking.

In some embodiments, the mechanisms can use an identified item or bundle of items as an input to any other suitable system, for example, a robotic system for picking, handling, and/or packing items. For example, in some embodiments, the mechanisms can cause instructions that identify the items or a bundle of items to the robotic system, which can then select the items.

In some embodiments, the mechanisms described herein can create a new bundle of items based on identifying similar items. For example, in instances where a first bundle includes items A, B, and C, the mechanisms can identify an item A' that is similar to item A (based on any suitable similarity attributes as described below in connection with FIG. 1), an item B' that is similar to item B, and an item C' that is similar to item C. The mechanisms can then create a second bundle that includes items A', B', and C'. Note that, in some embodiments, a new bundle can be created incorporating any suitable number of items included in the first bundle. For example, continuing with the example above, the mechanisms can create a new bundle that includes items A', B, and C. As another example, the mechanisms can create a new bundle that includes items A', B', and C.

Figure 1:
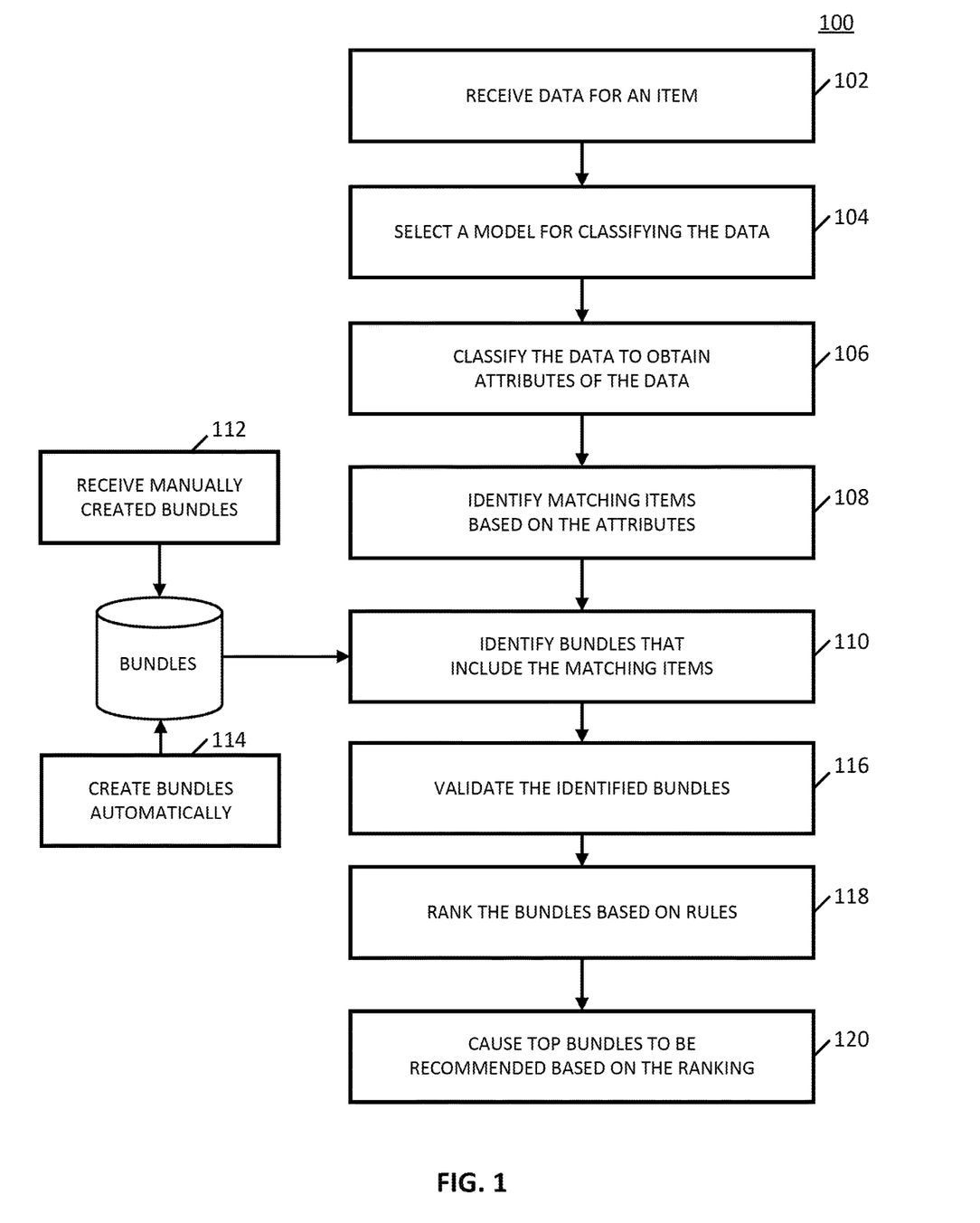
FIG. 1 shows an example of a process for recommending information based on grouping information in accordance with some embodiments of the disclosed subject matter.

Turning to FIG. 1, an example 100 of a process for recommending items is shown in accordance with some embodiments of the disclosed subject matter.

Process 100 can begin by receiving data for a first item. In some embodiments, the first item can be any suitable type of item, such as a food item, an article (e.g., a news article, a blog post, and/or any other suitable type of article), a book, a clothing item, a piece of furniture, and/or any other suitable type of item. In some embodiments, the data for an item can be received in any suitable manner. For example, in some embodiments, the data can be scraped from a web page in which the item and information about the item is presented. As a more particular example, in instances where the item is an item is presented on the web page, the data can be scraped from the web page in which the item is listed along with information about the item. In some embodiments, process 100 can use any suitable techniques and/or tools to scrape data from web pages, including any suitable headless browsers (e.g., splash, phantomjs, and/or any other suitable headless browsers), and/or any other suitable tools. As another example, in some embodiments, process 100 can receive data from any other suitable data source, such as a document containing Extensible Markup Language (XML), a document containing JavaScript Object Notation (JSON), and/or any other suitable data source. Additionally or alternatively, in some embodiments, the data can be manually entered.

In some embodiments, the data for the first item can include any suitable information. For example, in some embodiments, the data can include one or more images of the item (e.g., images of the item from different perspectives, images of the item in use, and/or any other suitable images) and/or one or more images of things associated with the item. As a more particular example, in instances where the first item is an article, the data can include one or more images included in the article. As another more particular example, in instances where the first item is a food item, the data can include a picture of the food and/or a picture of packaging the food item commonly comes in. As yet another example, in instances where the first item is a clothing item, the data can include an image of the clothing item. As another example, in some embodiments, the data can include descriptions of the first item. In some embodiments, the descriptions can include any suitable content, such as text, icons, graphics, and/or any other suitable content. As a more particular example, in some embodiments, the description can include reviews of the item, suggestions of a full meal that includes a particular food item, text of an article, analysis of an article, a group of links that includes a link to an article, and/or any other suitable text.

Process 100 can select one or more models for classifying the data at 104. In some embodiments, process 100 can select a model for classifying the data based on content of the data. For example, in instances where the data includes one or more images, process 100 can select a model for identifying various features of the images (e.g., a color of the images, a texture of items in the images, identify prints or objects embroidered on items in the images, and/or any other suitable features). As a more particular example, in instances where the data includes one or more images, process 100 can select one or more algorithms to identify one or more colors of the item as captured in the image (e.g., a k-means algorithm, and/or any other suitable type of algorithm). As a specific example, in instances where the data includes one or more images, process 100 can use a k-means algorithm to cluster pixels of an image based on a color value (e.g., a Red-Green-Blue color value, and/or any other suitable color value) of the pixel into any suitable number of clusters (e.g., two, three, five, and/or any other suitable number), and can determine one or more dominant colors of the image based on the clusters. In instances where the data includes images, process 100 can select any suitable image recognition algorithm(s) or image processing algorithm(s). Additionally or alternatively, in some embodiments, in instances where the data includes images, process 100 can use any suitable machine learning algorithms (e.g., a neural network, a logistic regression, any suitable classifier, and/or any other suitable algorithms) to identify features of the images (e.g., objects in the images, borders or edges of the images, colors included in the images, and/or any other suitable features).

As another example, in instances where the data includes text (e.g., in a description of the item), process 100 can select any suitable natural language processing algorithms. As a more particular example, in some embodiments, process 100 can select a natural language processing algorithm suitable for identifying features described in the text (e.g., a size of the item, materials from which the item is made, a style of the item, a fit of the item, and/or any other suitable features), an algorithm suitable for detecting sentiment associated with the item (e.g., included in reviews of the item from users who viewed and/or used the item), and/or any other suitable algorithm. As a specific example, in some embodiments, the natural language processing algorithm(s) can use n-gram (e.g., a bigram model, a trigram model, etc.) count a frequency with which words or groups of words appear in text included in the data to identify particular categories associated with the first item.

As a specific example, if the first item is an article (e.g., a news article, and/or any other suitable type of article), the algorithm(s) can analyze text of the article to determine a topic of the article (e.g., politics, health, science, a particular person, a particular event, and/or any other suitable topic), a viewpoint of the article (e.g., a particular bias or leaning of the perspective, and/or any other suitable viewpoint), whether the article is opinion or news, and/or any other suitable information. In particular, the algorithm(s) can analyze the text based on how frequently words or clusters of words such as "in my opinion," "last week," "championship game," and/or any other suitable words or clusters of words appear. As another specific example, if the first item is a food item, the algorithm(s) can analyze text included in the data (e.g., text that suggests a meal that includes the food item, and/or any other suitable text) to determine a food group of the food item (e.g., meat, dairy, grain, vegetable, beverage, and/or any other suitable food group), nutritional information associated with the food item, and/or any other suitable information based on how frequently words or clusters of words such as "casserole," "serve with a side salad," "pair with red wine," and/or any other suitable words or groups of words appear in the text. As yet another specific example, if the first item is a clothing item, the algorithm(s) can analyze text included in the data to determine a category of clothing (e.g., shirt, pants, accessories, and/or any other suitable category), a formality of the clothing (e.g., business, casual, party, and/or any other suitable formality), a fit of the clothing (e.g., loose, fitted, slim-fit, and/or any other suitable fit), and/or any other suitable category based on how frequently words or clusters of words such as "billowy top," "day-to-night," "versatile," "ankle length," and/or any other suitable words or groups of words appear. Note that, in some embodiments, process 100 can select multiple models for classifying the data. For example, in instances where the data includes both images and text, process 100 can select an image recognition algorithm and a natural language processing algorithm.

Note that, in some embodiments, selected models can use any suitable training data for classifying the data. For example, in instances where a machine learning algorithm is used to analyze images included in the data, the training data can include images that have been annotated as being predominantly particular colors, having edges or borders at particular locations, and/or any other suitable features. As another example, in instances where a machine learning algorithm and/or natural language processing algorithm is used to determine sentiment included in reviews of the first item included in the data, the training data can include words or groups of words annotated as indicating particular sentiments (e.g., "negative," "positive," "like," "dislike," and/or any other suitable sentiments). In some embodiments, the training data can be stored in any suitable location, such as a server as shown in and described below in connection with FIG. 2.

Process 100 can classify the data to obtain attributes of the data at 106 using the selected model. In some embodiments, the attributes can include any suitable information. For example, in instances where the first item is an article, the attributes can include a topic of the article, an author of the article, a source of the article or location where the article was published, whether the article is an opinion piece, and/or any other suitable attributes. As another example, in instances where the first item is a food item, the attributes can include a type of dish commonly associated with the food item (e.g., a main dish, a side dish, an appetizer, a beverage, and/or any other suitable type of dish), a texture of the food item (e.g., chewy, crispy, and/or any other suitable texture), a food group category (e.g., meat, vegetable, salad, grain, and/or any other suitable food group category), a temperature at which the food item is typically server (e.g., cold, room temperature, hot, and/or any other suitable temperature), and/or any other suitable attributes. As yet another example, in instances where the first item is a clothing item, the attributes can include one or more colors of the item, a size of the item (or available sizes of the item), a name of a creator of the item, a date associated with the item (e.g., a date the item was created, a season during which the item was first released, and/or any other suitable date information), one or more materials that the item is made of, a style and/or formality of the item (e.g., casual, business, and/or any other suitable style), and/or any other suitable attributes.

In some embodiments, the attributes can be stored in any suitable format. For example, in some embodiments, the attributes can be stored in a parent-child structure, where the parent value indicates a category of the attribute and the child value indicates the information for the particular category for the item. As a more particular example, in instances where the first item is an article, the attributes can be stored as: article type-news, topic-politics, author-John Doe, etc. As another more particular example, in instances where the first item is a food item, the attributes can be stored as: food type-salad, dish type-appetizer, food group-vegetables, etc. As another more particular example, in instances where the first item is a clothing item, attributes can be stored as: available sizes-small, color-black, clothing type-shirt, fit-loose, formality-casual, length-waist, etc. In some embodiments, the attributes associated with a particular item can be stored in any suitable location, such as in a server, as shown in and described below in connection with FIG. 2.

Process 100 can identify one or more items similar to the first item at 108. For example, in instances where the first item is a first article (e.g., a news article about a current event), process 100 can identify a second article that is similar to the first article (e.g., a different news article about the current event, an opinion article about the current event, a different article by the same author, and/or any other suitable similar article). As another example, in instances where the first item is a food item included in a meal (e.g., a sandwich, a pasta dish, soup, and/or any other suitable food item), process 100 can identify a similar food item. As yet another example, in instances where the first item is a black shirt, process 100 can identify one or more other black shirts.

Note that, in some embodiments, process 100 can identify the one or more items based on any suitable attributes (e.g., genre, item category, texture, name of a creator of the item, a source of the item, item type, size, style, color, and/or any other suitable attributes) and any suitable number of attributes (e.g., one, two, five, ten, and/or any other suitable number). Process 100 can identify the other items using any suitable technique or combination of techniques. For example, in some embodiments, process 100 can calculate a distance metric (e.g., a Euclidean distance) between the first item and each item in a group of candidate items for each of a group of attributes, and can identify the one or more items as those with the lowest distance, and therefore, most similar to the first item. As a more particular example, if an attribute included in the distance metric is color, process 100 can calculate a Euclidean distance between a Red-Green-Blue (RGB) value associated with the first item and RGB values of each item in the group of candidate items to identify an item most similar to the first item based on a color attribute. Note that, in some embodiments, process 100 can convert attribute values to numeric values to calculate a distance metric in any suitable manner. For example, in instances where attribute values correspond to sizes (e.g., "small," "medium," and "large,"), process 100 can assign a numeric value to each possible size (e.g., "small" is 1, "medium" is 2, and "large" is 3).

In some embodiments, the attributes for the one or more items that are compared to the first item can be determined in any suitable manner and using any suitable techniques. For example, in some embodiments, the attributes for each of the other items can be determined using data retrieved for the item as described above in connection with block 102 and the attributes can be determined using the techniques described above in connection with block 106. In some embodiments, the data for each of the one or more items can be retrieved from any suitable source. For example, similar to as described above in connection with block 102, the data can be scraped from any suitable website(s). In some such embodiments, the website(s) used to obtain data for the one or more items can be the same as or different from website(s) used to obtain data for the first item as described above in connection with block 102.

Note that, in instances where distances between attributes of a first item and corresponding attributes of each item in the group of candidate items are calculated for multiple attributes, process 100 can calculate an aggregate distance metric by combining individual distance metrics corresponding to each attribute in any suitable manner. For example, in some embodiments, individual distance metrics can be combined using a weighted average, where each attribute is associated with a particular weight. As a more particular example, in some embodiments, a color attribute can be associated with a first weight and a formality attribute can be associated with a second weight, and the aggregate distance metric between two items can be calculated by weighting a first color distance by the first weight and a second formality distance by the second weight. In some embodiments, weights of different metrics can be modified at any suitable time and based on any suitable information, for example, based on information indicating that two items that were previously determined to be similar using a first set of weights are not similar, thereby indicating that the first set of weights are to be adjusted in a manner that produces an aggregate distance metric indicating less similarity between the two items.

Process 100 can identify one or more bundles that include the identified similar item at 110. For example, in instances where the items are articles, process 100 can identify one or more groups of articles that include the identified similar articles. As a more particular example, if one of the identified similar articles is a news article published on a particular date, process 100 can identify a group of articles that includes other articles published on the same date. As another example, in instances where the identified similar items are food items, process 100 can identify one or more meals that include the food items. As a more particular example, if an identified similar food item is a salad, process 100 can identify a meal that includes a particular main dish served with the salad, a beverage served with the salad, and/or any other suitable meal components. As yet another example, in instances where the items are clothing items, process 100 can identify one or more outfits that include the identified items. Process 100 can identify the bundles in any suitable manner. For example, in some embodiments, a bundle can be identified in a database in a server, and individual items included in the bundle can be identified as items within a database entry corresponding to the bundle.

Note that, in some embodiments, a bundle of items can be grouped as a bundle in any suitable manner. For example, as shown in block 112 of FIG. 1, a bundle can be manually created. As a more particular example, in some instances where a bundle is a meal, the bundle can be created by a food blogger, a food writer at a newspaper, and/or any other suitable entity.

As another example, as shown in block 114, in some embodiments, a bundle can be created automatically and/or algorithmically. As a more particular example, in some embodiments, a bundle can be algorithmically created by identifying any suitable number of items as similar to items in an existing bundle. As a specific example, in an instance where a first bundle includes items A, B, and C, items A', B', and C' can be identified as similar to items A, B, and C, respectively. In some embodiments, any suitable number of new bundles can be created that include any suitable mix of items A, B, C, A', B', and C'. For example, in some embodiments, new bundles can include: A', B, and C; A, B', and C; A, B, and C', A', B', and C; A', B', and C', etc. As another more particular example, in some embodiments, an algorithmically created bundle can include top-rated meals on a particular website, articles published on a particular date by a particular publisher, articles published within a particular time period pertaining to a particular topic, the top N viewed clothing items on a particular website, and/or any other suitable bundle of items. Note that, in some embodiments, an algorithmically created bundle may be subject to human verification or approval.

Process 100 can validate identified bundles at 116. For example, in some embodiments, process 100 can confirm that the identified bundles satisfy any particular criteria. As a more particular example, in instances where the identified bundles each correspond to a group of articles, process 100 can determine whether the identified groups of articles satisfy criteria related to a quality of a source of each article, a popularity of each article (e.g., based on a number of views of the article, and/or any other suitable popularity metric), and/or any other suitable criteria. As another more particular example, in instances where the identified bundles each correspond to a meal, process 100 can determine whether the identified meals satisfy criteria related to health (e.g., less than a predetermined number of calories per serving, less than a predetermined amount of fat per serving, and/or any other suitable health criteria), dietary guidelines (e.g., vegetarian, and/or any other suitable guidelines), and/or satisfy any other suitable criteria. As yet another more particular example, in instances where the identified bundles are each an outfit made up of different clothing items, process 100 can confirm that the identified bundles satisfy criteria related to aesthetics (e.g., no more than a predetermined number of different prints, no more than a predetermined number of different fabrics, and/or any other suitable aesthetics criteria), and/or any other suitable criteria. In some embodiments, process 100 can remove any bundles that do not satisfy the criteria.

Figure 4:
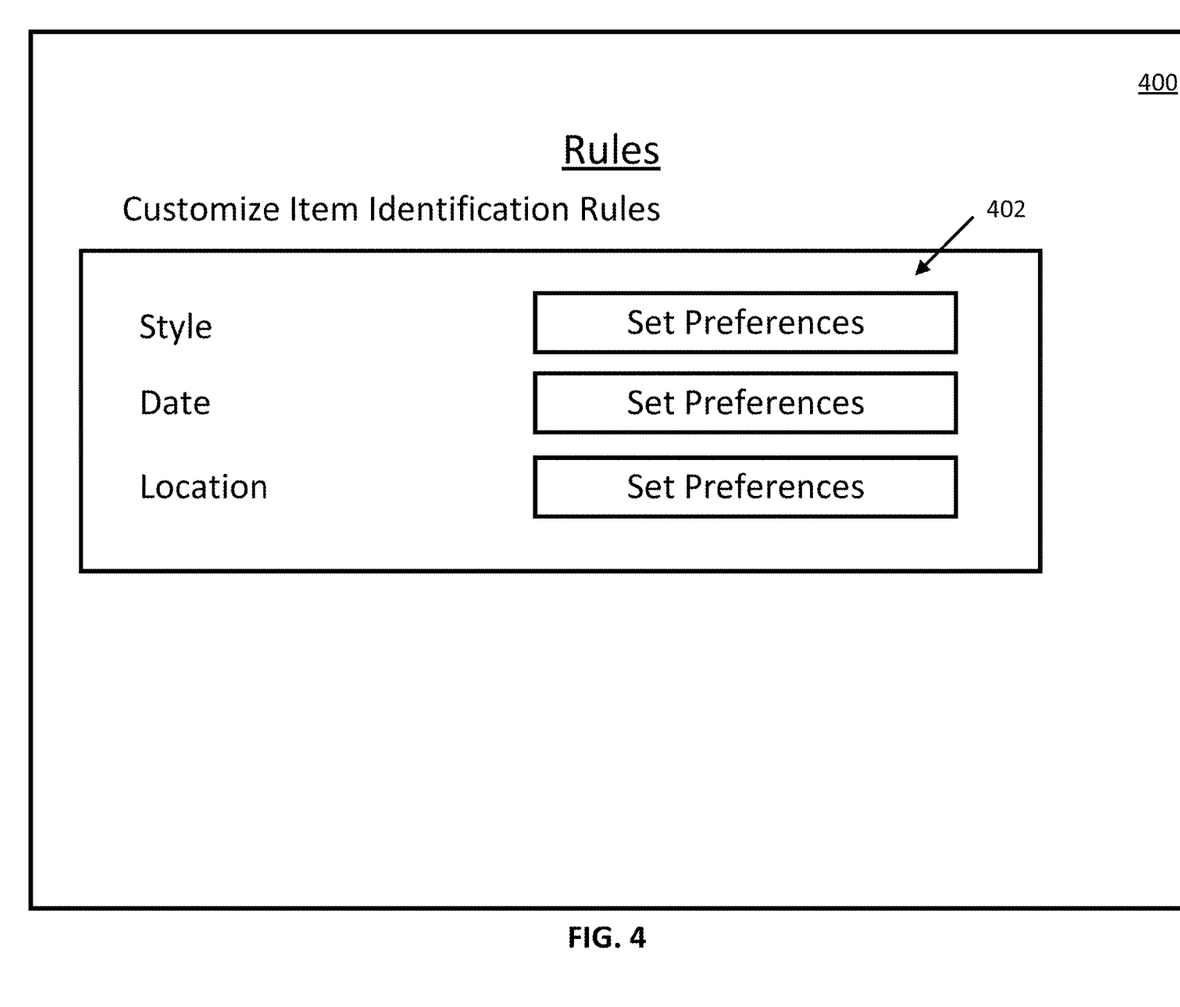
FIG. 4 shows an example of a user interface for receiving rules for ranking information in accordance with some embodiments of the disclosed subject matter.

Process 100 can rank the identified bundles based on any suitable rules at 118. In some embodiments, the rules can indicate any suitable information or criteria, as shown in user interface 400 of FIG. 4. For example, in some embodiments, rules 402 can indicate date information associated with the items and/or bundles, location information associated with the items and/or bundles, style information associated with the items and/or bundles, and/or any other suitable information. As a more particular example, in instances where the rules include date information (e.g., a date of creation of the bundle and/or items in the bundle, and/or any other suitable date information), process 100 can rank bundles with dates earlier than or later than the specified date(s) based on the rules. As another more particular example, in instances where the rules include location information, process 100 can rank bundles that are listed on particular websites (e.g., particular news sites, and/or any other suitable particular websites) higher than other bundles based on the location information. In some embodiments, any suitable entity can provide the rules used to rank the bundles. For example, in some embodiments, the rules can be provided by an entity providing recommendations of items to a user (e.g., a library providing book recommendations, a website that provides recipes suggesting different meals or food combinations to a user, a clothing website suggesting additional clothing items to a user, and/or any other suitable entity).

Figure 5:
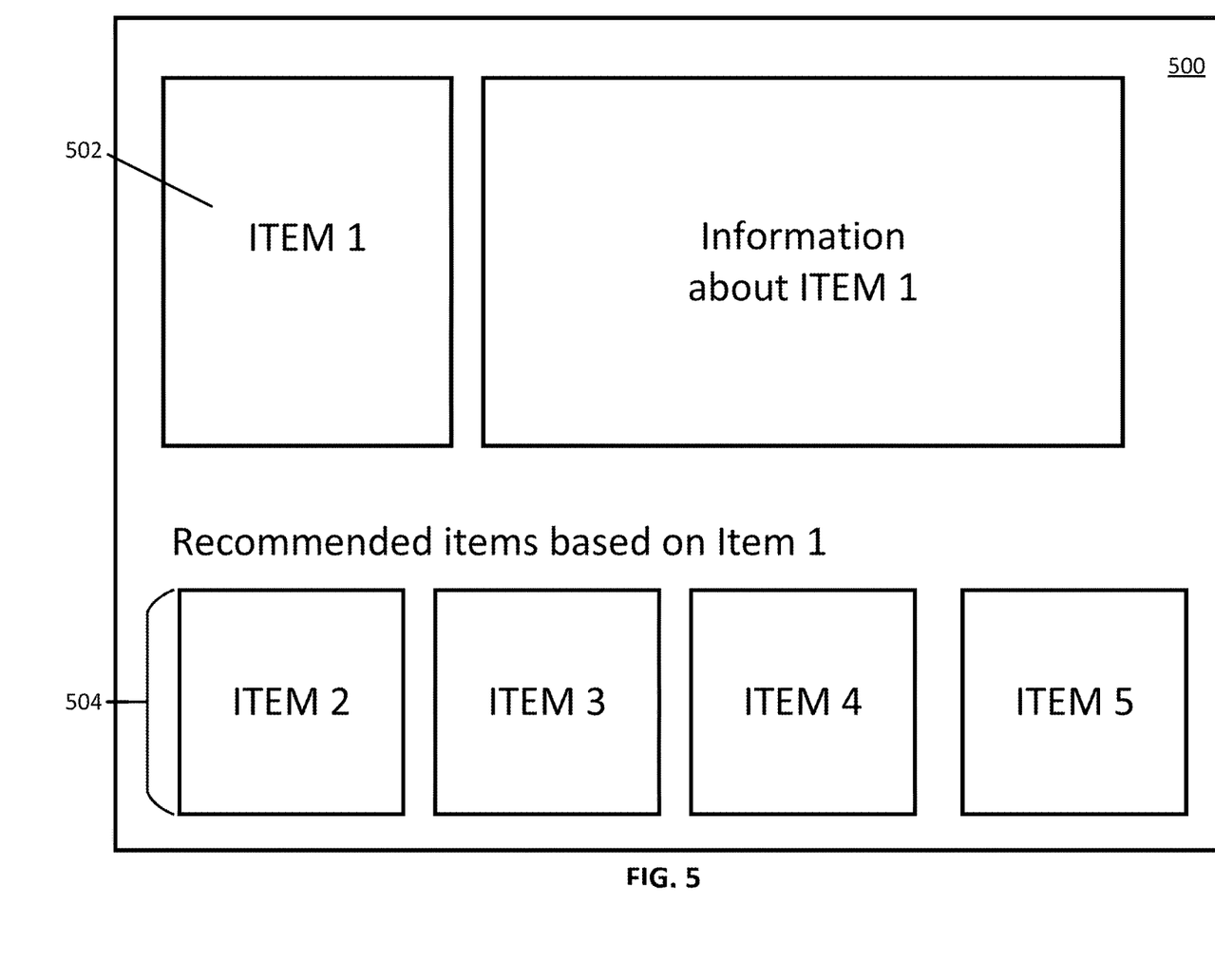
FIG. 5 shows an example of a user interface for recommending information in accordance with some embodiments of the disclosed subject matter.

Process 100 can cause the top N (e.g., one, two, five, ten, and/or any other suitable number) bundles to be recommended based on the ranking. In some embodiments, the bundles can be recommended within a user interface as shown in user interface 500 of FIG. 5. In some embodiments, user interface 500 can be presented in response to a user requesting information about a first item 502, as shown in FIG. 5. In some such embodiments, process 100 can identify bundles to recommend based on the blocks of process 100 described above, and can present recommended bundles 504, as shown in FIG. 5. In some embodiments, selection of a recommended bundle can cause a browser window in which user interface 500 is presented to redirect to a page related to the selected bundle. Note that, in some embodiments, process 100 can recommend individual items within the top N bundles. For example, in instances where the identified bundles are groups of articles, process 100 can recommend an article included in one of the groups of articles. As another example, in instances where the identified bundles are meals, process 100 can recommend a dish (e.g., a main dish, an appetizer, a dessert, a beverage, and/or any other suitable dish) included in one of the meals identified at block 118. As yet another example, in instances where the identified bundles are outfits, process 100 can recommend a component of the outfit (e.g., pants, a belt, shoes, a bag, and/or any other suitable component) included in one or more of the outfits identified at block 118.

Note that, in some embodiments, process 100 can additionally or alternatively provide instructions to any other suitable system. For example, in some embodiments, process 100 can provide instructions that identify one or more items and/or one or more bundles of items to a robotic system that selects the identified items, for example, for packaging.

Figure 2:
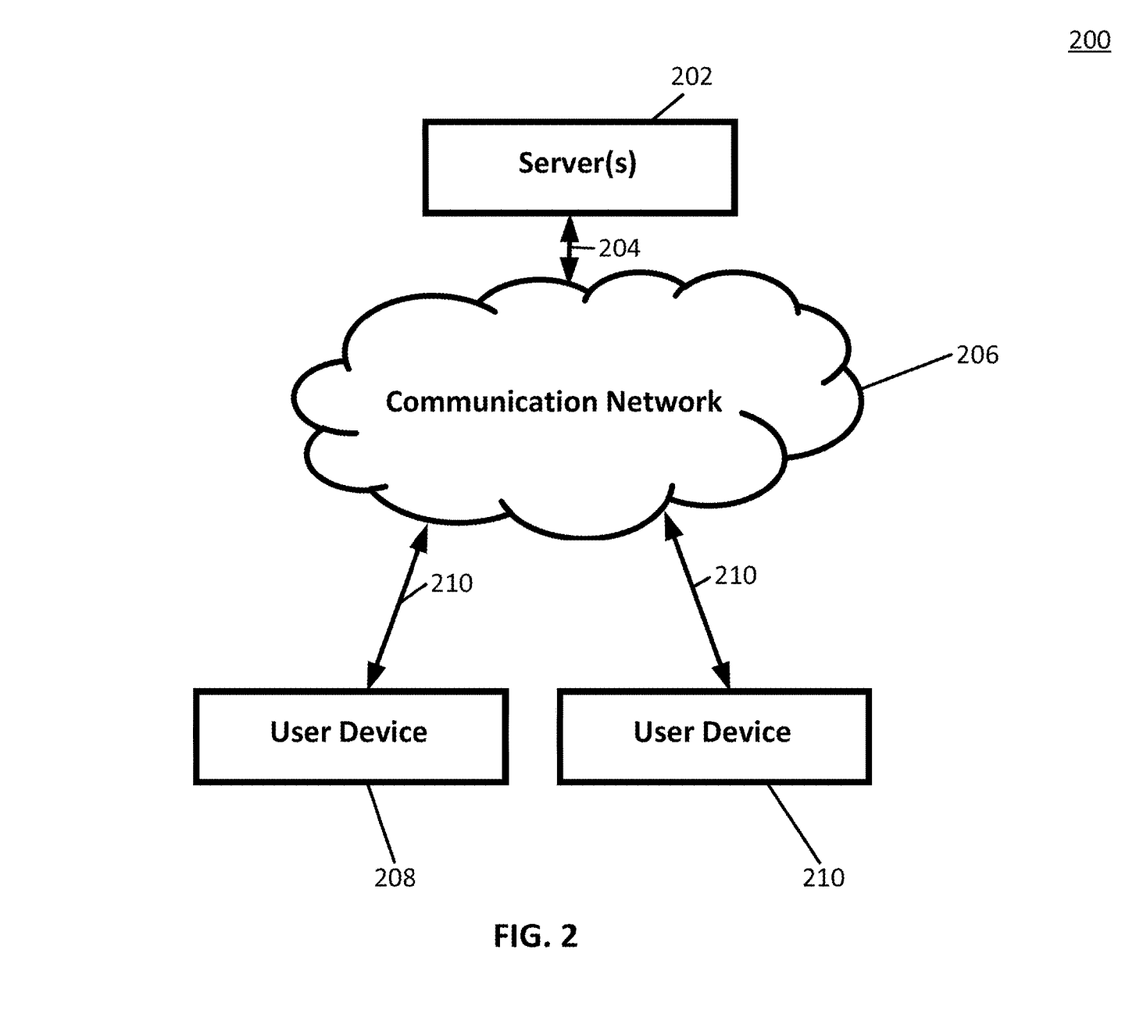
FIG. 2 shows a schematic diagram of an example of a system for recommending information based on grouping information in accordance with some embodiments of the disclosed subject matter.

Turning to FIG. 2, an example 200 of hardware for recommending items in accordance with some embodiments of the disclosed subject matter is shown. As illustrated, hardware 200 can include one or more servers 202, a communication network 206, and user devices 208 and/or 210.

Server(s) 202 can be any suitable servers for storing data about items, identifying bundles that include items similar to a particular item, recommending items included in identified bundles, and/or performing any other suitable functions. For example, as shown in and described above in connection with FIG. 1, server(s) 202 can identify attributes (e.g., category, color, pricing information, and/or any other suitable attributes) associated with a particular item. As another example, in some embodiments, server(s) 202 can identify one or more bundles that include items similar to a particular item based on one or more of the identified attributes. As yet another example, in some embodiments, server(s) 202 can rank identified bundles based on any suitable rules, as described above in connection with FIGS. 1 and 4. As still another example, in some embodiments, server(s) 202 can cause recommendations for items to be presented on a user device.

Communication network 206 can be any suitable combination of one or more wired and/or wireless networks in some embodiments. For example, communication network 110 can include any one or more of the Internet, a mobile data network, a satellite network, a local area network, a wide area network, a telephone network, a cable television network, a WiFi network, a WiMax network, and/or any other suitable communication network.

User devices 208 and/or 210 can be any suitable user devices for setting rules for ranking bundles of items and/or ranking items, presenting recommendations for an item, and/or performing any other suitable functions. For example, in some embodiments, user device 208 can be associated with a website, blog, and/or other suitable entity that provides items or recommendations of items to users. In some such embodiments, a user of user device 208 can enter rules for ranking bundles of items and/or ranking items (e.g., as shown in and described above in connection with FIGS. 1 and 4), and can transmit the rules to server(s) 202. As another example, in some embodiments, user device 210 can be associated with a user viewing a particular item, and user device 210 can present recommendations for other items related to the particular item (e.g., based on the recommended items being included in bundles with items similar to the particular item, as shown in and described above in connection with FIG. 1). In some such embodiments, the recommendations can be presented on user device 210 via a user interface, such as user interface 500 shown in FIG. 5. In some embodiments, user devices 208 and/or 210 can include mobile devices (e.g., a mobile phone, a laptop computer, a wearable computer, and/or any other suitable mobile device) and/or non-mobile devices (e.g., a desktop computer, a smart television, and/or any other suitable non-mobile devices). In some embodiments, user devices 208 and/or 210 can be local to each other or remote from each other. User devices 208 and/or 210 can be connected by one or more communication links 210 to communication network 206 that can be linked via communication link 204 to server 202.

Although only one server 202 is shown in FIG. 1 to avoid over-complicating the figure, any suitable number of servers can be used in some embodiments.

Server(s) 202 and user devices 208 and 210 can be implemented using any suitable hardware in some embodiments. For example, in some embodiments, devices 202, 208, and 210 can be implemented using any suitable general purpose computer or special purpose computer. For example, a server may be implemented using a special purpose computer. Any such general purpose computer or special purpose computer can include any suitable hardware. For example, as illustrated in example hardware 300 of FIG. 3, such hardware can include hardware processor 302, memory and/or storage 304, an input device controller 306, an input device 308, display/audio drivers 310, display and audio output circuitry 312, communication interface(s) 314, an antenna 316, and a bus 318.

Figure 3:
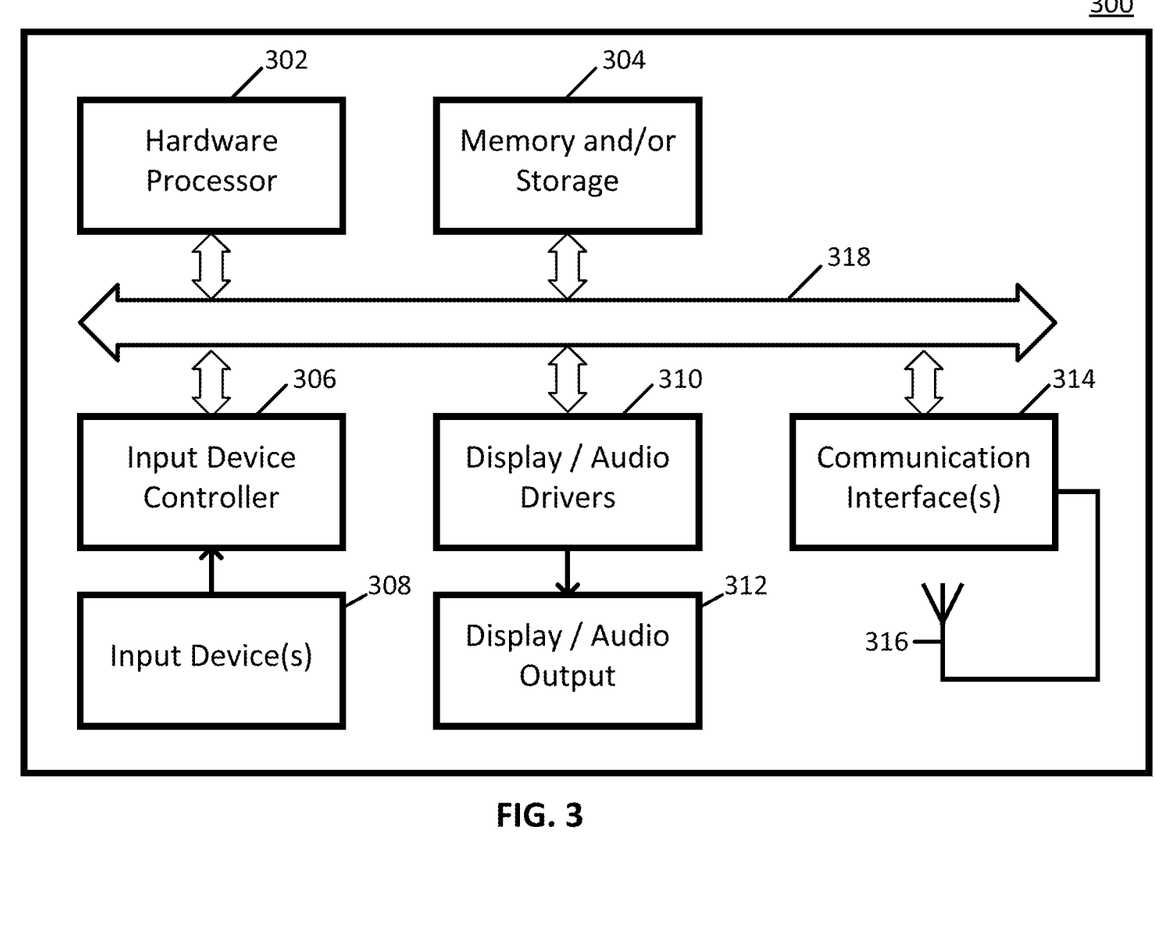
FIG. 3 shows an example of hardware that can be used in a server and/or a user device in accordance with some embodiments of the disclosed subject matter.

Hardware processor 302 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 304 can be any suitable memory and/or storage for storing programs, data, and/or any other suitable information in some embodiments. For example, memory and/or storage 304 can include random access memory, read-only memory, flash memory, hard disk storage, optical media, and/or any other suitable memory.

Input device controller 306 can be any suitable circuitry for controlling and receiving input from a device in some embodiments. For example, input device controller 306 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 310 can be any suitable circuitry for controlling and driving output to one or more display/audio output circuitries 312 in some embodiments. For example, display/audio drivers 310 can be circuitry for driving an LCD display, a speaker, an LED, or any other type of output device.

Communication interface(s) 314 can be any suitable circuitry for interfacing with one or more communication networks, such as network 204 as shown in FIG. 2. For example, interface(s) 314 can include network interface card circuitry, wireless communication circuitry, and/or any other suitable type of communication network circuitry.

Antenna 316 can be any suitable one or more antennas for wirelessly communicating with a communication network in some embodiments. In some embodiments, antenna 316 can be omitted when not needed.

Bus 318 can be any suitable mechanism for communicating between two or more components 302, 304, 306, 310, and 314 in some embodiments.

Any other suitable components can be included in hardware 300 in accordance with some embodiments.

It should be understood that at least some of the above described blocks of the process of FIG. 1 can be executed or performed in any order or sequence not limited to the order and sequence shown in and described in the figure. Also, some of the above blocks of the process of FIG. 1 can be executed or performed substantially simultaneously where appropriate or in parallel to reduce latency and processing times. Additionally or alternatively, some of the above described blocks of the process of FIG. 1 can be omitted.

In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for recommending information based on grouping information are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method implemented by at least one server, the method comprising:
   receiving, by one or more hardware processors included as part of the at least one server, an image depicting an item by scraping the image from a web page using a headless browser, the one or more hardware processors including at least a display driver and an audio driver, the display driver and the audio driver operable for operating an output device;
   identifying, by at least one machine learning algorithm executed by the one or more hardware processors, the item within the image;
   determining, by the one or more hardware processors included as part of the at least one server, a portion of the item identified within the image using a k-means algorithm to cluster pixels of the image based on a color value of the pixels;
   deriving by the one or more hardware processors included as part of the at least one server, using the at least one machine learning algorithm, one or more styles of the item from the portion of the image;
   deriving by the one or more hardware processors included as part of the at least one server, using the at least one machine learning algorithm, one or more colors or characteristics of the item based on image analysis of the portion of the image;
   determining by the one or more hardware processors included as part of the at least one server, at least one or more recommended items based on the one or more colors or characteristics and/or the one or more styles;
   generating by the one or more hardware processors included as part of the at least one server, instructions for outputting the at least one or more recommended items on a user interface of a robotic system that is external to the at least one server;
   transmitting by the one or more hardware processors included as part of the at least one server, using a wired or wireless communication network, the instructions to the robotic system; and
   storing, in memory of the one or more hardware processors, the instructions.

2. The method of claim 1, further comprising performing natural language processing on text associated with the item to determine one or more features of the item, wherein the natural language processing uses an n-gram model to count a frequency with which words or groups of words appear in the text.

3. The method of claim 1, further comprising determining a Euclidean distance between the one or more colors or characteristics and/or the one or more styles.

4. The method of claim 1, further comprising classifying the image to identify attributes of the item.

5. The method of claim 1, wherein the at least one or more recommended items includes a bundle of a plurality of items, further comprising ranking a plurality of bundles including the bundle.

6. A system comprising:
   a memory of a hardware processor; and
   the hardware processor, included as part of at least one server, that is coupled to the memory, the hardware processor including a display driver and an audio driver, the display driver and the audio driver operable for operating an output device;
   a robotic system coupled to the hardware processor,
   wherein the hardware processor, included as part of the at least one server, is configured to:
      receive an image depicting an item by scraping the image from a web page using a headless browser;
      identify, using at least one machine learning algorithm, the item within the image;
      determine, using the at least one machine learning algorithm, a portion of the item identified within the image using a k-means algorithm to cluster pixels of the image based on a color value of the pixels;
      derive, using the at least one machine learning algorithm, one or more styles from the portion of the image;
      derive, using the at least one machine learning algorithm, one or more colors or characteristics of the item based on image analysis of the portion of the image;
      determine at least one or more recommended items based on the one or more colors or characteristics and/or the one or more styles;
      generate instructions for outputting the at least one or more recommended items on a user interface of the robotic system that is external to the at least one server;
      transmit, using a wired or wireless communication network, the instructions to the robotic system, the instructions used by the robotic system that is external to the at least one server; and
      storing, in the memory of the hardware processor, the instructions.

7. The system of claim 6, wherein the hardware processor is further configured to perform natural language processing on text associated with the item to determine one or more features of the item.

8. The system of claim 7, wherein the natural language processing uses an n-gram model to count a frequency with which words or groups of words appear in the text.

9. The system of claim 6, wherein the hardware processor is further configured to determine a Euclidean distance between the one or more colors or characteristics and/or the one or more styles.

10. The system of claim 6, wherein the hardware processor is further configured to classify the image to identify attributes of the item.

11. The system of claim 6, wherein the at least one or more recommended items includes a bundle of a plurality of items, and wherein the hardware processor is further configured to rank a plurality of bundles including the bundle.

12. A non-transitory computer-readable medium comprising computer executable instructions that, when executed by one or more hardware processors included as part of at least one server, cause the one or more hardware processors to perform operations comprising:

receiving an image depicting an item by scraping the image from a web page using a headless browser, the one or more hardware processors including at least a display driver and an audio driver, the display driver and the audio driver operable for operating an output device;

identifying, using at least one machine learning algorithm, the item within the image;

determining, using a k-means algorithm to cluster pixels of the image based on a color value of the pixels, a portion of the item identified within the image;

deriving, using the at least one machine learning algorithm, one or more styles of the item from the portion of the image;

deriving, using the at least one machine learning algorithm, one or more colors or characteristics of the item based on image analysis of the portion of the image;

determining at least one or more recommended items based on the one or more colors or characteristics and/or the one or more styles;

generating additional instructions for outputting the at least one or more recommended items on a user interface of a robotic system that is external to the at least one server;

transmitting, using a wired or wireless communication network, the additional instructions to the robotic system that is external to the at least one server, the additional instructions used by the robotic system for packing the at least one or more recommended items; and storing, in memory of the one or more hardware processors, the additional instructions.

13. The non-transitory computer-readable medium of claim 12, wherein the operations further comprise performing natural language processing on text associated with the item to determine one or more features of the item.

14. The non-transitory computer-readable medium of claim 13, wherein the natural language processing uses an n-gram model to count a frequency with which words or groups of words appear in the text.

15. The non-transitory computer-readable medium of claim 12, further comprising determining a Euclidean distance between the one or more colors or characteristics and/or the one or more styles.

16. The non-transitory computer-readable medium of claim 12, further comprising classifying the image to identify attributes of the item.

17. The non-transitory computer-readable medium of claim 12, wherein the at least one or more recommended items includes a bundle of a plurality of items, further comprising ranking a plurality of bundles including the bundle.

* * * * *